United States Patent
Song et al.

(10) Patent No.: US 12,232,003 B2
(45) Date of Patent: Feb. 18, 2025

(54) APPARATUS AND METHOD FOR SERVICE SUBSCRIPTION, USING E2 INTERFACE IN WIRELESS ACCESS NETWORK COMMUNICATION SYSTEM

(71) Applicant: Samsung Electronics Co., Ltd., Suwon-si (KR)

(72) Inventors: Junhyuk Song, Suwon-si (KR); Jeongyeob Oak, Suwon-si (KR); Chungkeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 270 days.

(21) Appl. No.: 17/711,675

(22) Filed: Apr. 1, 2022

(65) Prior Publication Data
US 2022/0225066 A1   Jul. 14, 2022

Related U.S. Application Data

(63) Continuation of application No. PCT/KR2020/013436, filed on Sep. 29, 2020.

(60) Provisional application No. 62/908,790, filed on Oct. 1, 2019.

(51) Int. Cl.
*H04W 4/60* (2018.01)
*H04W 4/12* (2009.01)
*H04W 88/12* (2009.01)
*H04W 92/20* (2009.01)

(52) U.S. Cl.
CPC .............. *H04W 4/60* (2018.02); *H04W 4/12* (2013.01); *H04W 88/12* (2013.01); *H04W 92/20* (2013.01)

(58) Field of Classification Search
CPC ......... H04W 4/60; H04W 4/12; H04W 88/12; H04W 92/20
See application file for complete search history.

(56) References Cited

U.S. PATENT DOCUMENTS

| | | | |
|---|---|---|---|
| 10,321,303 | B1 | 6/2019 | Namiranian |
| 2013/0003697 | A1 | 1/2013 | Adjakple et al. |
| 2020/0106536 | A1* | 4/2020 | Bedekar ............... H04W 48/20 |
| 2021/0037390 | A1* | 2/2021 | Tofighbakhsh ....... H04L 5/0044 |
| 2022/0225264 | A1 | 7/2022 | Song et al. |

FOREIGN PATENT DOCUMENTS

| | | |
|---|---|---|
| CN | 111654877 A | 9/2020 |
| CN | 114762401 A | 7/2022 |
| WO | 2019/113454 A1 | 6/2019 |

(Continued)

OTHER PUBLICATIONS

T. Czichy, Nokia, "5G RAN optimization using the O-RAN software community's RIC (Ran Intelligent Controller)" Open Networking Summit Europe, XP055697834, Sep. 23, 2019.

(Continued)

*Primary Examiner* — Samina F Choudhry
(74) *Attorney, Agent, or Firm* — Jefferson IP Law, LLP

(57) ABSTRACT

A method performed by an E2 node is provided. The method includes receiving, from a Radio Access Network (RAN) Intelligent Controller (RIC), an RIC subscription request message through an E2 interface. The RIC subscription request message may include information indicating a network interface type.

17 Claims, 21 Drawing Sheets

(56) References Cited

FOREIGN PATENT DOCUMENTS

WO    2019/183020 A1    9/2019

OTHER PUBLICATIONS

Anonymous, O-RAN Working Group 3, E2AP-v01.01, "O-RAN Working Group 3, Near-Real-time, RAN Intelligent Controller, E2 Application Protocol (E2AP)" XP009536365, Jul. 15, 2020.
Anonymous, O-RAN Working Group 3, E2SM-v01.00.00, "O-RAN Working Group 3, Near-Real-time RAN Intelligent Controller, E2, Service Model, (E2SM)" XP009539264, Jan. 31, 2020.
European Search Report dated Nov. 10, 2022, issued in European Application No. 20 87 2520.0.
O-Ran Software Community, OSC Use Case: Traffic Steering QoE, Mar. 12, 2019, XP055882094.
European Office Action dated Nov. 10, 2023, issued in European Application No. 20872520.0.
Czichy, "5G RAN optimization using the O-RAN software community's RIC (Ran Intelligent Controller)" Open Networking Summit (ONS) Europe 2019, Sep. 23, 2019.
Jana et al., "O-RAN SC Release A requirements" O-RAN Tokyo Workgroup Face-to-Face Meeting Information, Jun. 19, 2019.
Abeta et al., "O-RAN Alliance Standardization Trends" NTT DOCOMO Technical Journal, vol. 21, No. 1, Jul. 23019.
Schulz et al. "Network Architectures for Demanding 5G Performance Requirements" IEEE Vehicular Technology Magazine, vol. 14, Issue 2, Apr. 23, 2019.
Brian K. Daly et al., LS on O-RAN Alliance & 3GPP Coordination on O-RAN Alliance Outputs, CP-192245, O-RAN Alliance SDFG, Sep. 5, 2019.
Indian Office Action dated Feb. 13, 2024, issued in Indian Application No. 202217025392.
Chinese Office Action dated Apr. 18, 2024, issued in Chinese Application No. 202080074541.2.
Japanese Office Action dated Jul. 1, 2024, issued in Japanese Patent Application No. JP2022-520521.
Japanese Notice of Patent Grant dated Nov. 25, 2024, issued in Japanese Patent Application No. JP2022-520521.

\* cited by examiner

| IE/Group Name | Presence | Range | IE type and reference | Semantics description | Criticality | Assigned Criticality |
|---|---|---|---|---|---|---|
| Message Type | M | | X.X.X.X | | YES | reject |
| RIC REQUEST ID | M | | X.X.X.X | | YES | reject |
| E2 NODE FUNTION ID | M | | X.X.X.X | | YES | reject |
| RIC SUBSCRIPTION TYPE | M | | X.X.X.X | | YES | reject |

FIG.8

| IE/Group Name | Presence | Range | IE type and reference | Semantics description |
|---|---|---|---|---|
| Procedure Code | M | | INTEGER (0..255) | |
| Type of Message | M | | CHOICE(Initiating, Succesful, Unsuccesful, ...) | |

FIG.9

| IE/Group Name | Presence | Range | IE type and reference | Semantics description |
|---|---|---|---|---|
| RIC REQUEST ID | M | | INTEGER (0..65535) | |

FIG.10

| IE/Group Name | Presence | Range | IE type and reference | Semantics description |
|---|---|---|---|---|
| E2 NODE FUNTION ID | M | | INTEGER (0..4095) | |

FIG.11

| IE/Group Name | Presence | Range | IE type and reference | Semantics description |
|---|---|---|---|---|
| RIC SUBSCRIPTION TYPE | M | | INTEGER (0..255) | |

FIG.12

| IE/Group Name | Presence | Range | IE type and reference | Semantics description | Criticality | Assigned Criticality |
|---|---|---|---|---|---|---|
| INTERFACE AP ID | M | | INTEGER(0..255) | Protocol IDs for F1, E1, X2, XN, NGAP, S1, LTE-RRC, NR-RRC, etc. | YES | reject |
| Global Node ID | O | | | | YES | reject |
| MESSAGE PROTOCOL ID list | | | | | YES | reject |
| >CHOICE SubscriptionMessageCondition | M | | | | | |
| >>All Message | | | | | - | - |
| >>>SubscriptionMessage Information LIst | M | 1..<maxnnofMsg> | | | YES | reject |
| >>>>Subscription Message Information | | | Subscription Message Information x.x.x.x | | | |
| >>>>Message ID | M | | | | YES | reject |
| >>>>Interface Direction | O | | | | YES | ignore |
| Subscription Condition | | | | | | |
| >CHOICE Subscription Condition | M | | | | YES | reject |
| >>Target UE list | O | | | | YES | ignore |
| >>Target Slice list | O | | | | YES | ignore |
| >>Target Cell list | O | | | | YES | ignore |

FIG.13

| IE/Group Name | Presence | Range | IE type and reference | Semantics description | Criticality | Assigned Criticality |
|---|---|---|---|---|---|---|
| PLMN Identity | M | | | | - | - |
| CHOICE LTE eNB ID | M | | | | - | - |
| >Macro eNB ID | M | | BIT STRING (20) | Equal to the 20 leftmost bits of the value of the E-UTRAN Cell Identifier IE contained in the ECGI IE | - | - |
| >Home eNB ID | M | | BIT STRING (28) | Equal to the value of the E-UTRAN Cell identifier IE contained in the ECGI IE | - | - |
| >Short Macro eNB ID | M | | BIT STRING (SIZE (18)) | Equal to the 18 leftmost bits of the value of the E-UTRAN Cell Identifier IE contained in the ECGI IE | - | - |
| >Long Macro eNB ID | M | | BIT STRING (SIZE (21)) | Equal to the 21 leftmost bits of the value of the E-UTRAN Cell Identifier IE contained in the ECGI IE | - | - |
| >gNB ID | M | | BIT STRING (SIZE (22..32)) | Equal to the leftmost bits of the NR Cell Identity IE contained in the NR CGI IE of each cell served by the gNB. | - | - |

FIG.14

| IE/Group Name | Presence | Range | IE type and reference | Semantics description |
|---|---|---|---|---|
| UE ID List Item | | 1..<maxnnofUeID> | | |
| >RAN UE ID | M | | OCTET STRING (SIZE(8)) | |

FIG.15

| IE/Group Name | Presence | Range | IE type and reference | Semantics description |
|---|---|---|---|---|
| Target Slice List | | 1..<maxnoof SliceItems> | | |
| >S-NSSAI | M | | x.x.x.x | |

FIG.16

| IE/Group Name | Presence | Range | IE type and reference | Semantics description |
|---|---|---|---|---|
| Target Cell List | | 1..<maxnoof SliceItems> | | |
| CHOICE Cell Identifier | M | | | |
| >NR | | | | |
| >>NR Cell Identity | M | | BIT STRING (SIZE (36)) | The leftmost bits of the NR Cell Identity IE correspond to the gNB ID (defined in subclause 9.2.2.1) |
| >E-UTRA | | | | |
| >>E-UTRA Cell Identity | M | | BIT STRING (SIZE (28)) | The leftmost bits of the E-UTRA Cell Identity IE correspond to the ng-eNB ID (defined in subclause 9.2.2.8) |

FIG.17

| IE/Group Name | Presence | Range | IE type and reference | Semantics description |
|---|---|---|---|---|
| Subscriber Profile ID for subscription group ID | O | | INTEGER (1..256) | |
| Additional RRM Policy Index | O | | INTEGER (1..256) | |

FIG.18

| IE/Group Name | Presence | Range | IE type and reference | Semantics description | Criticality | Assigned Criticality |
|---|---|---|---|---|---|---|
| Message Type | M | | | | YES | reject |
| RIC REQUEST ID | M | | | | YES | reject |
| E2 NODE FUNTION ID | M | | | | YES | reject |
| SUBSCRIPTION RESULT | M | | | | YES | ignore |
| >SUBSCRIPTION RESULT ITEM | | | | | | |
| >>UE ID | O | | | | | |
| >>GROUP ID | O | | | | | |
| >>CELL ID | O | | | | | |
| >>NETWORK SLICE ID | O | | | | | |
| >>CHOICE SubscriptionMessageCondition | M | | | | | |
| >>All Messages | | | | | | |
| >>Partial Message List | | 1..maxnnofMsg | | | | |
| >>>Comlpete Message List Information IDs | | | | | | |
| >>>List of message IDs | | | | | | |

FIG.19

APPARATUS AND METHOD FOR SERVICE SUBSCRIPTION, USING E2 INTERFACE IN WIRELESS ACCESS NETWORK COMMUNICATION SYSTEM

CROSS-REFERENCE TO RELATED APPLICATION(S)

This application is a continuation application, claiming priority under § 365(c), of an International application No. PCT/KR2020/013436, filed on Sep. 29, 2020, which is based on and claims the benefit of a U.S. Provisional application Ser. No. 62/908,790, filed on Oct. 1, 2019, in the U.S. Patent and Trademark Office, the disclosure of each of which is incorporated by reference herein in its entirety.

BACKGROUND

1. Field

The disclosure relates to a wireless access network communication system. More particularly, the disclosure relates to an apparatus and method for service subscription for an Open Radio Access Network (O-RAN) base station using an E2 message of the wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

To meet a demand on wireless data traffic, a 5G system or a New Radio or Next Radio (NR) system has been commercialized, thereby providing a service with a high data rate to a user by using the 5G system similarly to 4G. In addition, it is expected that a wireless communication service is provided with various purposes such as Internet of Things and services requiring high reliability for specific purposes. In a current system in which a 4G communication system and a 5G communication system are used together, an Open Radio Access Network (O-RAN) created by vendors and equipment providers together defines a new Network Element (NE) and interface standard according to the existing $3^{rd}$ Generation Partnership Project (3GPP) standard, and provides an O-RAN architecture.

The above information is presented as background information only to assist with an understanding of the disclosure. No determination has been made, and no assertion is made, as to whether any of the above might be applicable as prior art with regard to the disclosure.

SUMMARY

Since a $4^{th}$ Generation (4G)/5th Generation (5G) communication system (hereinafter, referred to as a 4G/5G system, a New Radio or Next Radio (NR) system) has currently been commercialized, it is required to support a user-specific service in a virtualized network. An Open Radio Access Network (RAN) (O-RAN) has newly defined the existing $3^{rd}$ Generation Partnership Project (3GPP) Network Element (NE), Radio Unit (RU), Distributed Unit (DU), Central Unit (CU)-Control Plane (CP), and CU-User Plane (UP) respectively as O-RU, O-DU, O-CU-CP, and O-CU-UP. In addition thereto, the O-RAN has standardized a near-real-time RAN Intelligent Controller (RIC). The disclosure relates to an E2 subscription message used by the newly defined RIC to request the O-DU, the O-CU-CP, or the O-CU-UP to provide a service. In addition, the disclosure relates to a method of processing the E2 subscription message by dividing it on a UE, group, cell, and network slice basis. Herein, the O-RU, the O-DU, the O-CU-CP, and the O-CU-UP may be understood as objects constituting an RAN which may operate according to the O-RAN standard, and may be referred to as an E2 node.

Aspects of the disclosure are to address at least the above-mentioned problems and/or disadvantages and to provide at least the advantages described below. Accordingly, an aspect of the disclosure is to provide a method of a first node of a wireless communication system. The method includes generating, by an RIC, an E2 subscription request message after a setup between an E2 node and the RIC is complete or at the same time of the setup and then transmitting the message, receiving, by the E2 node, the E2 subscription request message transmitted by the RIC, and then configuring a call processing event, after the event is configured, transferring, to the RIC, a subscription request response message to report that the event is successfully configured, and upon occurrence of the call processing event conforming to a set condition, generating an E2 indication/report message based on the occurred event, and then transferring the message to the RIC.

In addition, the E2 subscription request message transferred by being carried together with the E2 set-up message or transmitted separately may be identified based on a detailed information element of the E2 subscription request transmitted from the RIC, and information element information may include message type identifier information configured based on a call processing function of the E2 node, RIC request identifier (ID) information, E2 node function ID identifier information, and RIC subscription type identifier information.

In addition, the E2 subscription response message may be identified based on a detailed information element of an E2 subscription response transmitted from the RIC, and information element information may include message type identifier information configured based on a call processing function of the E2 node, RIC request ID identifier information, E2 node function ID identifier information, and RIC subscription result identifier information.

Additional aspects will be set forth in part in the description which follows and, in part, will be apparent from the description, or may be learned by practice of the presented embodiments.

In accordance with an aspect of the disclosure, a method performed by an E2 node is provided. The method includes receiving, from a Radio Access Network (RAN) Intelligent Controller (RIC), an RIC subscription request message through an E2 interface. The RIC subscription request message may include information indicating a network interface type.

In accordance with another aspect of the disclosure, a method performed by an RIC is provided. The method includes transmitting an RIC subscription request message to an E2 node through an E2 interface. The RIC subscription request message may include information indicating a network interface type.

In accordance with another aspect of the disclosure, an apparatus functioning as an E2 node is provided. The apparatus includes at least one transceiver and at least one processor coupled to the at least one transceiver. The at least one processor may be configured to receive, from an RIC, an RIC subscription request message through an E2 interface. The RIC subscription request message may include information indicating a network interface type.

In accordance with another aspect of the disclosure, an apparatus functioning as an RIC is provided. The apparatus includes at least one transceiver and at least one processor coupled to the at least one transceiver. The at least one processor may be configured to transmit an RIC subscription request message to an E2 node through an E2 interface. The RIC subscription request message may include information indicating a network interface type.

An apparatus and method according to various embodiments of the disclosure indicate a type of a network interface in a subscription request for requesting subscription of a Radio Access Network (RAN) function of an E2 node, thereby providing an effective subscription procedure between a near Real Time (RT) RAN Intelligent Controller (RIC) and the E2 node.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 8, 9, 10, 11, 12, 13, 14, 15, 16, 17, 18, and 19 illustrate an example used for a subscription procedure according to various embodiments of the disclosure.

Throughout the drawings, it should be noted that like reference numbers are used to depict the same or similar elements, features, and structures.

DETAILED DESCRIPTION

Figure 1:
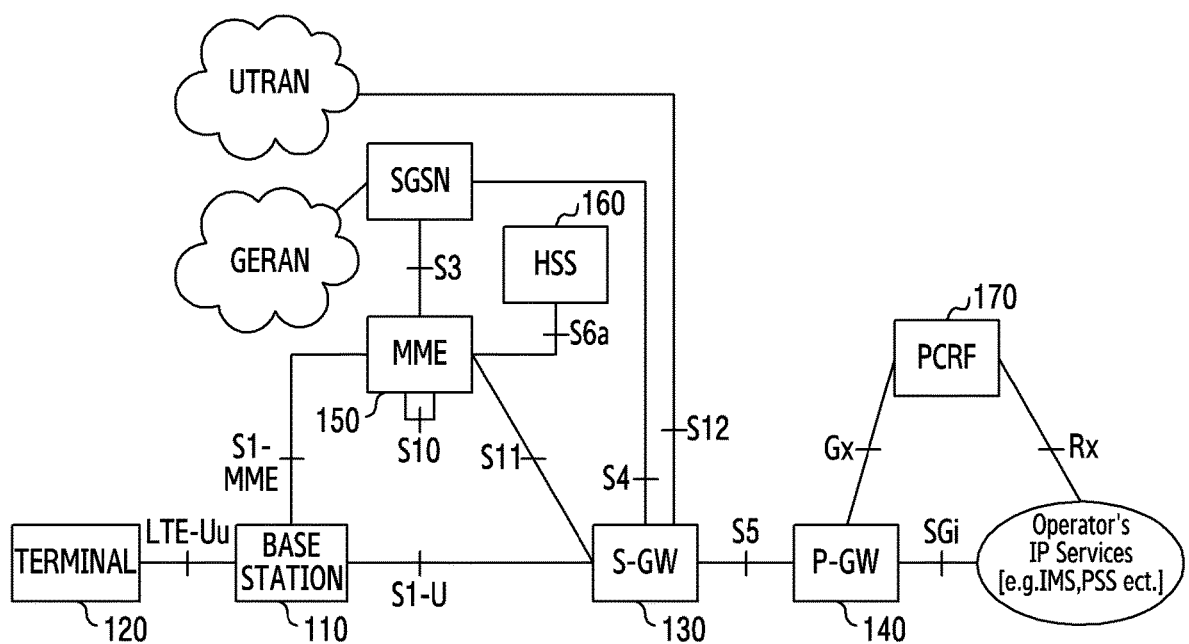
FIG. 1 illustrates an example of a 4$^{th}$ Generation (4G) Long Term Evolution (LTE) core system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A hardware-based approach is described for example in the various embodiments of the disclosure described hereinafter. However, since the various embodiments of the disclosure include a technique in which hardware and software are both used, a software-based approach is not excluded in the embodiments of the disclosure.

The disclosure described below relates to an apparatus and method for performing a subscription procedure between a device in a Radio Access Network (RAN) and a device for controlling the RAN in a wireless communication system.

Terms used hereinafter to refer to a signal, a channel, control information, a message, network entities, a component of a device, or the like are exemplified for convenience of explanation. Therefore, the disclosure is not limited to the terms described below, and thus other terms have the same technical meaning may also be used.

In addition, although the disclosure describes various embodiments by using terms used in some communication standards (e.g., 3$^{rd}$ Generation Partnership Project (3GPP)), this is for exemplary purposes only. Various embodiments of the disclosure may be easily modified and applied to other communication systems.

In the disclosure described below, an uplink means a radio link on which a terminal (e.g., a User Equipment (UE) or a Mobile Station (MS)) transmits data or a control signal to a base station (e.g., an evolved NodeB (eNodeB, eNB) or Base Station (BS)), and a downlink means a radio link on which the base station transmits data or a control signal to the terminal. In addition, the base station is an entity which performs resource allocation of the terminal, and may be at least one of an eNodeB, a Node B, a BS, a generation Node B (gNB), a radio access unit, a base station controller, and a node on a network. The terminal may include a UE, an MS, a cellular phone, a smart phone, a computer, or a multimedia system capable of performing a communication function.

To meet a demand on wireless data traffic, a 5$^{th}$ Generation (5G) communication system (hereinafter, interchangeably referred to as a 5G system, a New Radio or Next Radio (NR) system, or the like) has been commercialized, thereby providing a service with a high data rate to a user by using the 5G system similarly to a 4$^{th}$ Generation (4G) communication system. In addition, it is expected that a wireless communication service is provided with various purposes such as Internet of Things and services requiring high reliability for specific purposes.

In a current system in which a 4G communication system and a 5G communication system are used together, an Open Radio Access Network (O-RAN) created by vendors and equipment providers together has an O-RAN architecture launched according to a new Network Element (NE) and interface standard defined based on the existing 3GPP standard. The O-RAN has newly defined the existing 3GPP NE, Radio Unit (RU), Distributed Unit (DU), Central Unit (CU)-Control Plane (CP), and CU-User Plane (UP) respectively as O-RU, O-DU, O-CU-CP, and O-CU-UP. In addition thereto, the O-RAN has standardized a near-real-time RAN Intelligent Controller (RIC) and a Non-Real-Time (NRT) RIC. For example, the RIC may be a server deployed in one physical place in a concentrated manner. In addition, the RIC is a logical node capable of collecting information in a cell site in which the terminal performs transmission/reception with respect to the O-DU, O-CU-CP, or O-CU-UP. A connection between the O-DU and the RIC, between the O-CU-CP and the RIC, and between the O-CU-UP and the RIC may be established through the Ethernet. To this end, an interface standard for communication between the O-DU and the RIC, between the O-CU-CP and the RIC, and between the O-CU-UP and the RIC is required, and a message standard such as E2-DU, E2-CU-CP, and E2-CU-UP is required to define a procedure between the RIC and the O-DU, O-CU-CP, and O-CU-UP. In particular, a user-specific service is required in a virtualized network, and there is a need to define a function of a message of the O-DU, O-CU-CP, O-CU-UP, and RIC to support a service for wide cell coverage by allowing a call processing message/function generated in the O-RAN to be concentrated in the RIC.

Specifically, the RIC may configure an event occurrence condition by generating and transmitting an E2 subscription message to the O-DU, the O-CU-CP, or the O-CU-UP. The O-DU, the O-CU-CP, or the O-CU-UP may determine that the configured condition is satisfied, classify a 3GPP call processing message conforming to the condition into a user identifier, a cell identifier, a network slice identifier, or the like by carrying the message in a container, and then transmit it to the RIC through an E2 indication/report.

Call processing message information collected based on the user identifier in the O-RAN may be used to identify that the RIC is for a specific user/specific cell/specific network slot for each interface (I/F). The collected information may be transmitted from at least one of the (O-)CU-CP, the (O-)CU-UP, and the (O-)DU. The RIC may identify that information collected based on the user identifier from different entities is for one specific user/specific cell/specific network slice, provide a service specified for a specific user/specific cell/specific network slice for a plurality of cell/network slices based on the collected information, and determine a Key Performance Indicator (KPI) of a service provided to each user.

Since a general call processing service is limited on a base station basis, the number of supportable cells is limited. In addition, since collected information is limited to a specific base station, effective monitoring for all radio resources has not been possible. According to various embodiments of the disclosure, the RIC collects per-I/F or each call processing message (e.g., E1, F1, X2, XN, RRC, etc.) generated by the O-RU, the O-DU, or the O-CU-CP. Therefore, it is possible to optimize a resource for a specific user/specific cell/specific network slice for wide-range cells and effectively provide a user-specific service or a user-requested service. For example, in order to effectively divide a network slice or to optimize a resource, the RIC may configure an additional carrier so that a specific terminal is capable of receiving a service through carrier aggregation, or may configure an additional cell for performing Dual Connectivity (DC) so that the specific terminal is capable of receiving the service through the DC. In addition, the RIC may configure the specific terminal to be connected with a specific cell while avoiding the connection with the specific cell during inter-cell movement. In addition, the RIC may effectively perform resource optimization through machine learning according to analysis based on the collected information. In addition, the resource optimization of the disclosure is not limited to the described content. In addition, according to the disclosure, it is also possible to collect and analyze information for each bearer as well as collecting information for each terminal.

The collected information for each user may be used in a collection server or an RIC (near RIC) or an NRT-RIC, but may be provided to an Operation Support System (OSS) and/or a Business Support System (BSS) and thus may also be used to provide a user-specific service.

FIG. 1 illustrates an example of a 4$^{th}$ Generation (4G) Long Term Evolution (LTE) core system according to an embodiment of the disclosure.

Referring to FIG. 1, the LTE core system includes a base station 110, a terminal 120, a Serving Gateway (S-GW) 130, a Packet data network Gateway (P-GW) 140, a Mobility Management Entity (MME) 150, a Home Subscription Server (HSS) 160, and a Policy and Charging Rule Function (PCRF) 170.

The base station 110 is a network infrastructure which provides a radio access to the terminal 120. For example, the base station 110 is a device which performs scheduling by collecting state information such as a buffer state, available transmit power, channel state, or the like of the terminal 120. The base station 110 has coverage defined as a specific geographic region, based on a distance at which a signal is transmittable. The base station 110 is coupled to the MME 150 through an S1-MME interface. The base station 110 may be referred to as not only the base station but also an 'Access Point (AP)', an 'evolved NodeB (eNodeB, eNB)', a 'wireless point', a 'Transmission/Reception Point (TRP)', or other terms having equivalent technical meanings.

The terminal 120 is a device used by a user, and performs communication through a wireless channel with respect to the base station 110. Optionally, the terminal 120 may operate without a user's involvement. That is, at least one of the terminal 120 and the S-GW 130 is a device which performs Machine Type Communication (MTC), and may not be carried by a user. The terminal 120 may be referred to as not only the terminal but also a 'User Equipment (UE)', a 'mobile station', a 'subscriber station', a Customer-Premises Equipment (CPE), a 'remote terminal', a 'wireless terminal', a 'user device', or other terms having equivalent technical meanings.

The S-GW 130 provides a data bearer, and create or remove the data bearer under the control of the MME 150. For example, the S-GW 130 processes a packet arrived from the base station 110 or a packet to be forwarded to the base station 110. In addition, the S-GW 130 may perform an anchoring role when the terminal 120 performs a handover between base stations. The P-GW 140 may function as a connectivity point with respect to an external network (e.g., an Internet network). In addition, the P-GW 140 allocates an Internet Protocol (IP) address to the terminal 120, and performs an anchoring role for the S-GW 130. In addition, the P-GW 140 applies a Quality of Service (QoS) policy of the terminal 120, and may manage account data.

The MME 150 manages mobility of the terminal 120. In addition, the MME 150 may perform authentication, bearer management, or the like for the terminal 120. That is, the MME 150 is responsible for mobility management and a variety of control functions. The MME 150 may interwork with a Serving GPRS Support Node (SGSN).

The HSS 160 stores a subscriber profile and key information for authentication of the terminal 120. The subscriber profile and the key information are transferred from the HSS 160 to the MME 150 when the terminal 120 accesses the network.

The PCRF 170 defines policy and charging rules. The stored information is transferred from the PCRF 180 to the P-GW 140, and the P-GW 140 may provide control (e.g., QoS management, charging, etc.) to the terminal 120, based on information provided from the PCRF 180.

A carrier aggregation (hereinafter, 'CA') is a technique in which a plurality of component carriers are aggregated so that one terminal transmits/receives a signal by using the plurality of component carriers simultaneously, thereby increasing frequency usage efficiency in terms of the terminal or the base station. Specifically, according to the CA technology, the terminal and the base station may use the plurality of component carriers in each of an Uplink (UL) and a Downlink (DL) to transmit/receive a broadband signal. In this case, each of the component carriers is located at a different frequency band. Hereinafter, the UL means a communication link on which the terminal transmits a signal to the base station, and the DL means a communication link on which the base station transmits a signal to the terminal. In this case, the number of UL component carriers and the number of DL component carriers may be different from each other.

A dual connectivity or multi connectivity technology is a technology in which one terminal is coupled to a plurality of different base stations to transmit/receive a signal by simultaneously using carriers in each of the plurality of base stations located at different frequency bands, thereby increasing frequency usage efficiency in terms of the terminal or the base station. The terminal may transmit/receive traffic by being coupled simultaneously to a first base station (e.g., a base station which provides a service by using an LTE technology or a 4G mobile communication technology) and a second base station (e.g., a base station which provides a service by using a New Radio (NR) technology or a 5G mobile communication technology). In this case, a frequency resource used by each base station may be located at a different band. A scheme which operates based on the dual connectivity technology of the LTE and the NR may be called a 5G Non-Stand Alone (NSA).

Figure 2A:
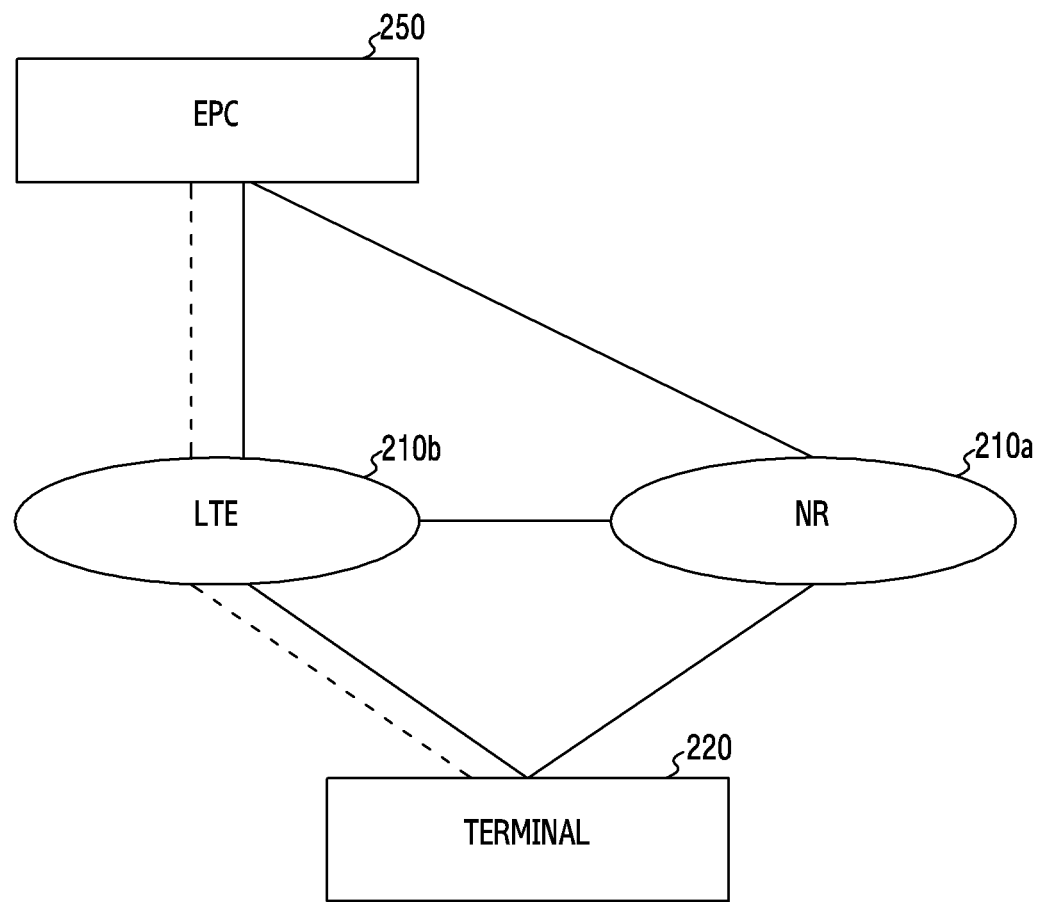
FIG. 2A illustrates an example of a 5$^{th}$ Generation (5G) non-standalone (NSA) system according to an embodiment of the disclosure.

FIG. 2A illustrates an example of a 5G NSA system according to an embodiment of the disclosure.

Referring to FIG. 2A, the 5G NSA system includes an NR RAN 210a, an LTE RAN 210b, a terminal 220, and an EPC 250. The NR RAN 210a and the LTE RAN 210b may be coupled to the EPC 250, and the terminal 220 may receive a service from any one of, or simultaneously both, the NR RAN 210a and the LTE RAN 210b. The NR RAN 210a includes at least one NR base station, and the LTE RAN 210b includes at least one LTE base station. Herein, the NR base station may be referred to as a '5$^{th}$ generation node', a 'next generation nodeB (gNodeB, gNB)', or other terms having equivalent technical meanings. In addition, the NR base station may have a structure divided into a Central Unit (CU) and a Digital Unit (DU), and the CU may have a structure divided into a CU-Control Plane (CP) unit and a CU-User Plane (UP) unit.

In the structure of FIG. 2A, the terminal 220 may perform Radio Resource Control (RRC) access through a first base station (e.g., a base station belonging to the LTE RAN 210b), and may be provided a service of a function (e.g., connectivity management, mobility management, etc.) provided in a control plane. In addition, the terminal 220 may be provided an additional radio resource for transmitting/receiving data through a second base station (e.g., a base station belonging to the NR RAN 210a). The dual connectivity technology using the LTE and NR may be referred to as Evolved Universal Terrestrial Radio Access (E-UTRA)-NR Dual Connectivity (DC) (EN-DC). Similarly, the dual connectivity technology in which the first base station uses the NR technology and the second base station uses the LTE technology is referred to as NR-E-UTRA Dual Connectivity (NE-DC). In addition, various embodiments may be applied to various types of multi connectivity and carrier aggregation technologies. In addition, various embodiments may also be applied to a case where a first system using a first communication technology and a second system using a second communication technology are implemented in one device or a case where the first base station and the second base station are located at the same geographic position.

Figure 2B:
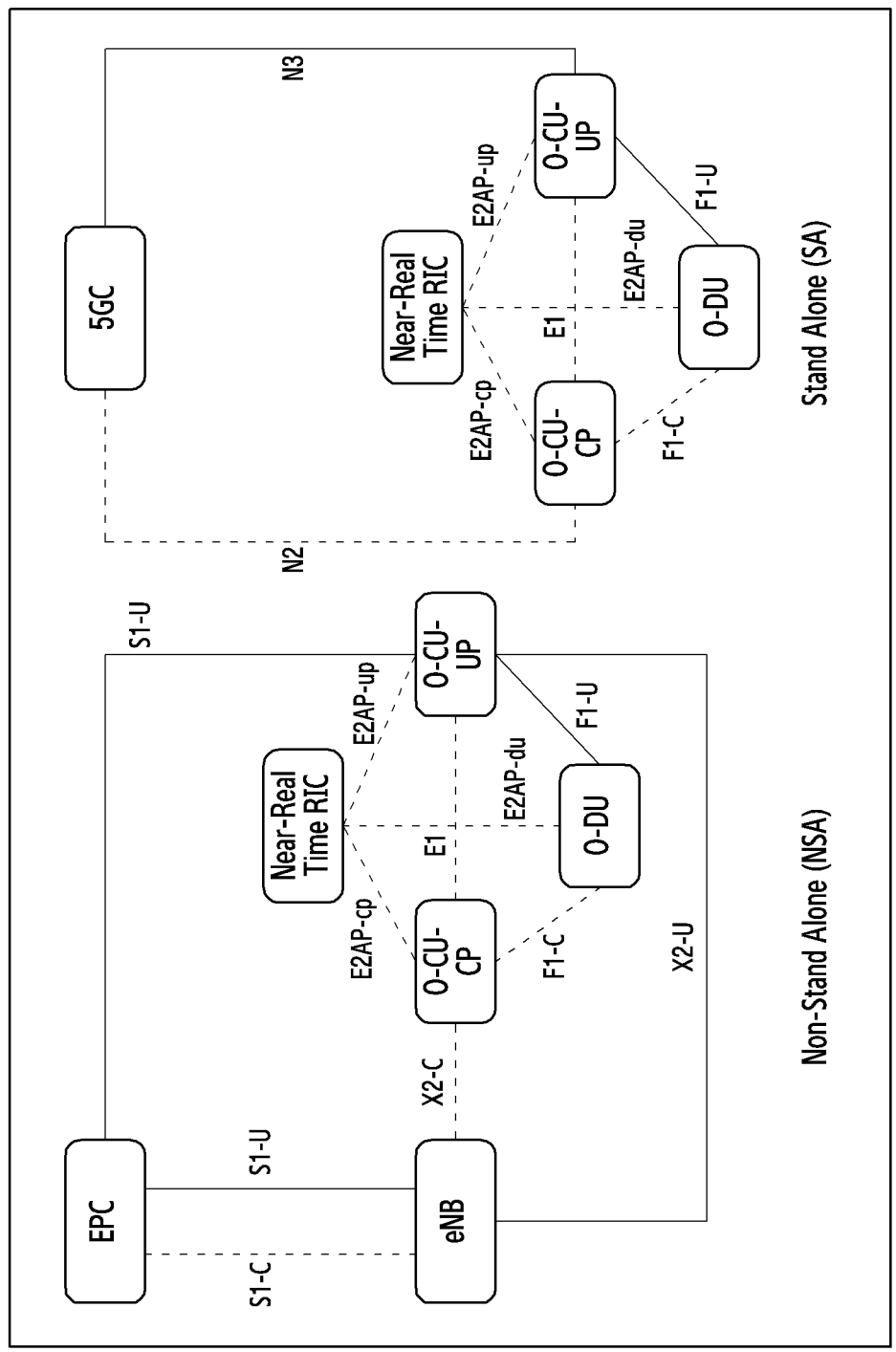
FIG. 2B illustrates an example of an architecture for an Open Radio Access Network (O-RAN) according to an embodiment of the disclosure.

FIG. 2B illustrates an example of an architecture for an O-RAN according to an embodiment of the disclosure. For the purpose of E2-SM-Key Performance Indicator (KPI) Monitoring (KPIMON) of an E2 service model, an O-RAN non-standalone mode in a multi-connectivity operation using an E-UTRA and NR radio access technology may be considered. Meanwhile, it may be assumed that an E2 node is in an O-RAN standalone mode.

Referring to FIG. 2B, in the deployment of the O-RAN standalone mode, an eNB is coupled to an EPC through an S1-C/S1-U interface, and is coupled to an O-CU-CP through an X2 interface. The O-CU-CP for the deployment of the O-RAN standalone mode may be coupled to a 5G Core (5GC) through an N2/N3 interface.

Figure 3:
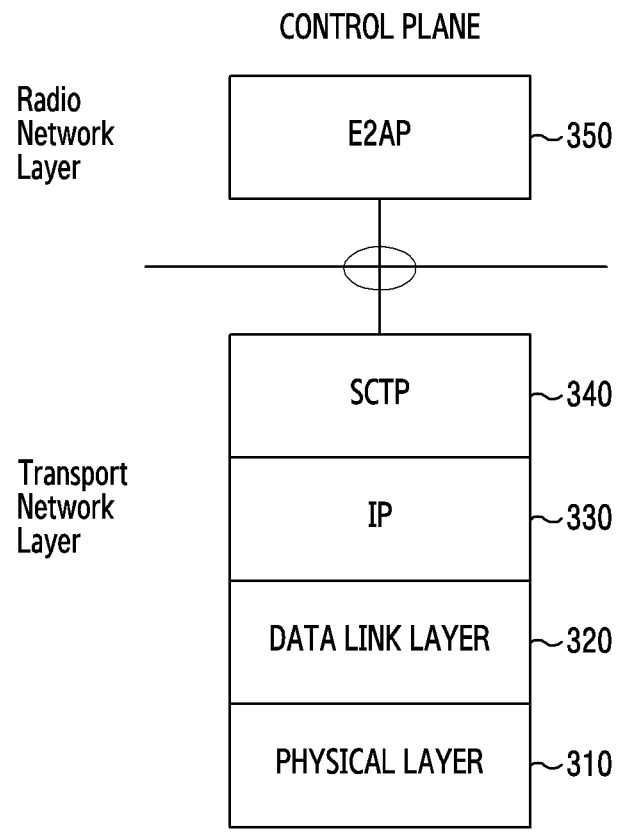
FIG. 3 illustrates a protocol stack of an E2 application protocol message in a radio access network according to an embodiment of the disclosure.

FIG. 3 illustrates a protocol stack of an E2 application protocol message in a radio access network according to an embodiment of the disclosure.

Referring to FIG. 3, a control plane includes a transport network layer and a radio network layer. The transport network layer includes a physical layer 310, a data link layer 320, an Internet Protocol (IP) layer 330, and a Stream Control Transmission Protocol (SCTP) layer 340.

The radio network layer includes an E2 application protocol (E2AP) 350. The E2AP 350 is used to transfer a subscription message, an indication message, a control message, a service update message, and a service query message, and is transmitted in a higher layer of the SCTP layer 340 and IP layer 330.

Figure 4:
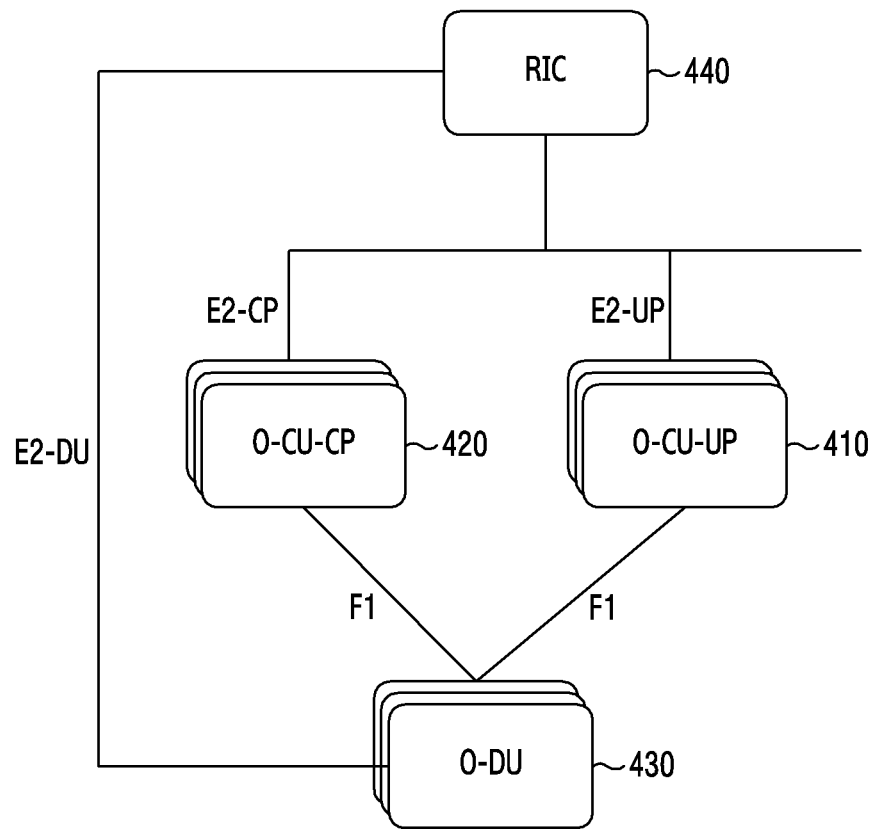
FIG. 4 illustrates an example of a connection between a base station and a Radio Access Network (RAN) Intelligent Controller (RIC) in a radio access network according to an embodiment of the disclosure.

FIG. 4 illustrates an example of a connection between a base station and an RIC in a radio access network according to an embodiment of the disclosure.

Referring to FIG. 4, an RIC 440 is coupled to an O-CU-CP 420, an O-CU-UP 410, and an O-DU 430. The RIC 440 is responsible for a function for controlling an RAN node (or as a device for performing an RAN function, for example, the O-CU-CP 420, the O-CU-UP 410, and the O-DU 430). The RIC 440 may be defined as a device for customizing RAN functionality for a new service or regional resource optimization. The RIC 440 may provide a function such as network intelligence (e.g., policy enforcement, handover optimization), resource assurance (e.g., radio-link management, advanced Self-Organized Network (SON)), resource control (e.g., load balancing, slicing policy), or the like. The RIC 440 may perform communication with the O-CU-CP 420, the O-CU-UP 410, and the O-DU 430. The RIC 440 may be coupled to each node through E2-CP, E2-UP, and E2-DU interfaces. In addition, an interface between the O-CU-CP and the DU and between the O-CU-UP and the DU may be referred to as an F1 interface. In the following description, the DU and the O-DU, the CU-CP and the O-CU-CP, and the CU-UP and the O-CU-UP may be used interchangeably.

Although one RIC 440 is illustrated in FIG. 4 for example, a plurality of RICs may be present according to various embodiments. The plurality of RICs may be implemented with a plurality of hardware entities located at the same physical position or may be implemented through virtualization using one hardware entity.

Figure 5:
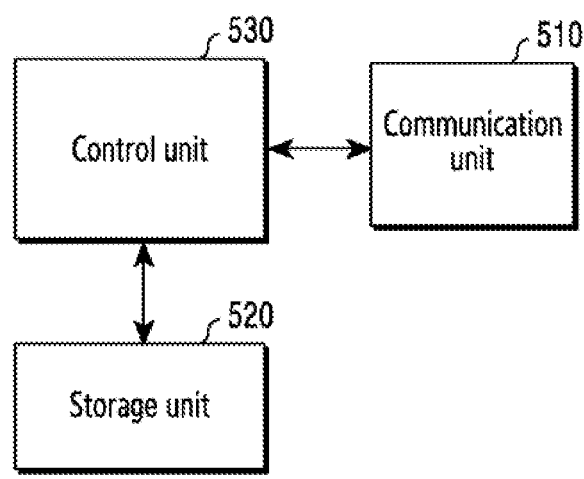
FIG. 5 illustrates a structure of a device according to an embodiment of the disclosure.

FIG. 5 illustrates a structure of a device according to an embodiment of the disclosure. The structure of FIG. 5 may be understood as a structure of a device which performs at least one function among the RIC, O-CU-CP, O-CU-UP, and O-DU of FIG. 5. Hereinafter, the term '. . . unit', '. . . device', or the like implies a unit of processing at least one function or operation, and may be implemented in hardware or software or in combination of the hardware and the software.

Referring to FIG. 5, a core network device includes a communication unit (e.g., a transceiver) 510, a storage unit (e.g., a memory) 520, and a control unit (e.g., a processor) 530.

The communication unit 510 provides an interface for preforming communication with different nodes in a network. That is, the communication unit 510 converts a bit-stream transmitted from the core network device to a different device, and converts a physical signal received from the different device into a bit-stream. That is, the communication unit 510 may transmit and receive a signal. Accordingly, the communication unit 510 may be referred to as a transmitter, a receiver, or a transceiver. In this case, the communication unit 510 may allow the core network device to communication with other devices or systems via a backhaul connection (e.g., a wired backhaul or a wireless backhaul).

The storage unit 520 stores a basic program, application program, setup information, or the like for an operation of the core network device. The storage unit 520 may be constructed of a volatile memory, a non-volatile memory, or a combination of the volatile memory and the non-volatile memory. In addition, the storage unit 520 provides the stored data at the request of the control unit 530.

The control unit 530 controls overall operations of the core network device. For example, the control unit 530 transmits and receives a signal via the communication unit 510. In addition, the control unit 530 writes data to and reads data from the storage unit 520. For this, the control unit 530 may include at least one processor. According to various embodiments, the control unit 530 may control the core network device to perform operations in accordance with various embodiments described below.

Figure 6:
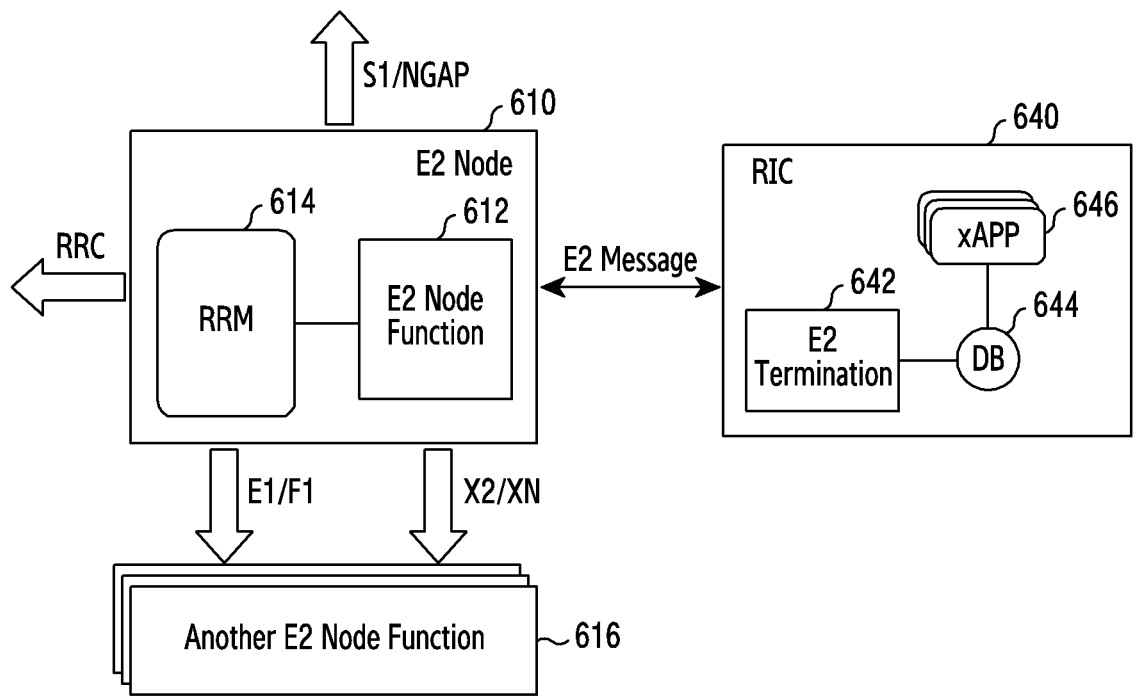
FIG. 6 illustrates a logical function related to an E2 message of an E2 node and RIC in a radio access network according to an embodiment of the disclosure.

FIG. 6 illustrates a logical function related to an E2 message of an E2 node and RIC in a radio access network according to an embodiment of the disclosure.

Referring to FIG. 6, an RIC 640 and an E2 node 610 may mutually transmit or receive an E2 message. For example, the E2 node 610 may be an O-CU-CP, an O-CU-UP, an O-DU, or a base station. A communication interface of the E2 node may be determined according to a type of the E2 node 610. For example, the E2 node 610 may perform communication with another E2 node 616 through an E1 interface or an F1 interface. Alternatively, for example, the E2 node 610 may perform communication with the E2 node 616 through an X2 interface or an XN interface. Alternatively, for example, the E2 node 610 may perform communication through an S1 interface or a Next Generation Application Protocol (NGAP) interface (i.e., an interface between a Next Generation (NG) RAN node and an access and mobility function (AMF)).

The E2 node 610 may include an E2 node function 612. The E2 node function 612 is a function corresponding to a specific application S/W (xApp) 646 installed in the RIC 640. For example, in case of a KPI monitor, a KPI monitor collection S/W is installed in the RIC 640, and the E2 node 610 may include the E2 node function 612 which generates KPI parameters and then transfers an E2 message including the KPI parameter to an E2 termination 642 located in the RIC 640. The E2 node 610 may include a Radio Resource Management (RRM) 614. The E2 node 610 may manage a resource provided to a radio network for a terminal.

The E2 termination 642 located in the RIC 640 is a termination of the RIC 640 for the E2 message, and performs a function which interprets the E2 message transferred by the E2 node 610 and then transfers it to the xApp 646. A Database (DB) 644 located in the RIC 640 may be used for the E2 termination 624 or the xApp 646. The E2 node 610 of FIG. 6 is a termination of at least one interface, and may be understood as a termination of messages to be transferred to the terminal, a neighboring base station, and a core network.

Figure 7A:
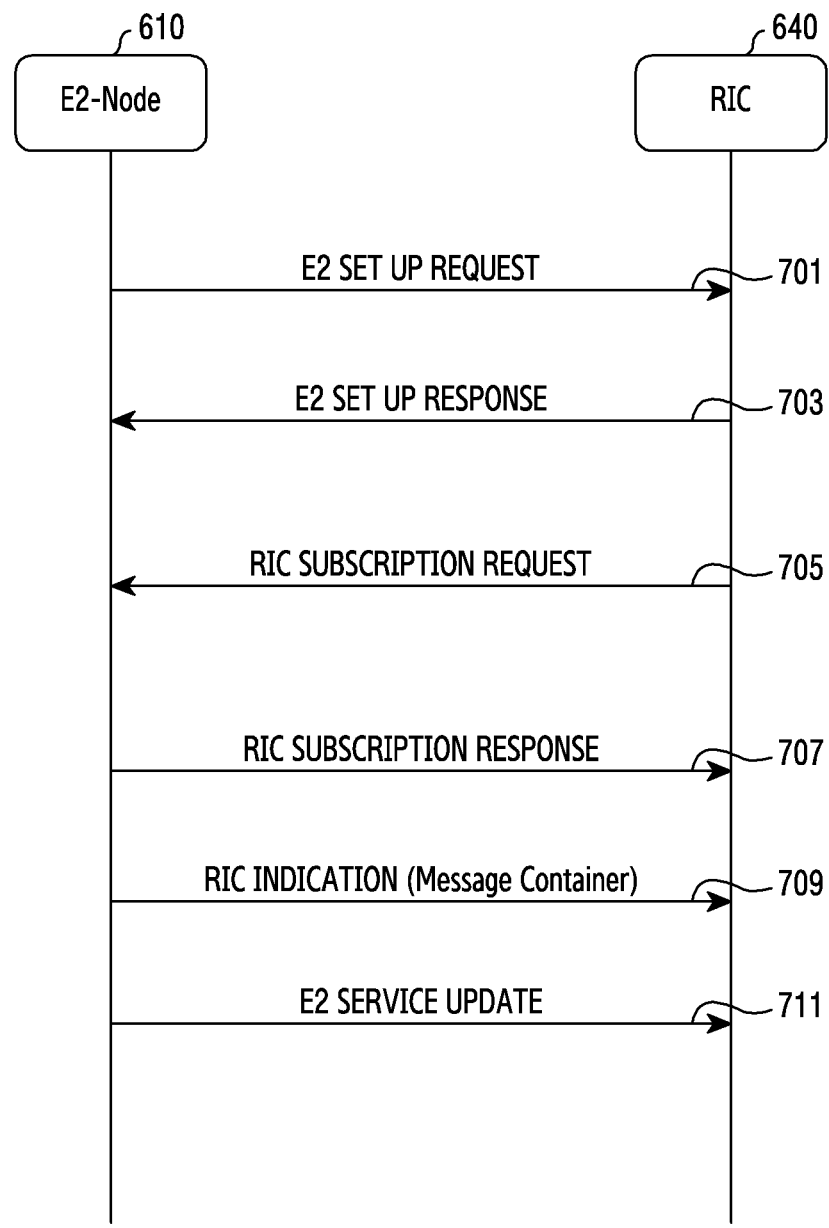
FIG. 7A illustrates an example of a signaling procedure between an E2 node and an RIC according to an embodiment of the disclosure.

FIG. 7A illustrates an example of a signaling procedure between an E2 node and an RIC according to an embodiment of the disclosure. Specifically, FIG. 7A illustrates an RIC subscription message transfer procedure and a setup procedure of an E2 I/F between the E2 node and the RIC. The E2 node 610 is exemplified as the E2 node, and the RIC 640 is exemplified as the RIC.

Referring to FIG. 7A, in operation 701, the E2 node may transmit an E2 set-up request message to the RIC. An E2 node function located in the E2 node finds the RIC by using an RIC IP address which is set to Operation, Administration, and Maintenance (OAM), and transmits an E2 set-up request message. The E2 set-up request message includes RAN function definition, which defines a function of an RAN supported by the E2 node, E2 node ID information, or the like. An RAN function definition value is a value which is set to the OAM, and information on a value which is set to the OAM in the RIC is received as the RAN function definition value to determine which call processing function is supported by the E2 node.

In operation 703, the RIC may receive an E2 set-up response message from the E2 node. If the E2 set-up request message transmitted by the E2 node is acceptable, the RIC may transmit the E2 set-up response message.

In operation 705, the RIC may transmit a subscription request message to the E2 node. A specific xApp located in the RIC requests the RIC E2 termination function to subscribe a specific RAN function definition function supported in the E2. Herein, the subscription request message in the operation 705 may be transmitted together by being included in the E2 set-up response message according to an embodiment. For example, an RAN function may include a function of X2AP, F1AP, E1AP, S1AP, and NGAP interfaces or an internal RAN function for controlling UEs or cells.

In operation 707, the E2 node may transmit a subscription request response to the RIC. The E2 node function of the E2 node decodes a subscription request message, successfully configures an event condition requested by the RIC to the E2 node function, and then transfers a subscription response to the RIC to report that an event trigger condition is successfully configured.

In operation 709, the E2 node may transmit an E2 RIC indication message to the RIC. When a specific event condition occurs, the E2 node transfers the E2 RIC indication message to the RIC.

In operation 711, the E2 node may transmit a service update message to the RIC. When there is a change in an E2 NODE function capability information element (E2 Node-Capa), the E2 node transmits to the RIC the changed E2 NodeCapa in E2 service update.

Although the set-up procedure, the RIC subscription procedure, the RIC indication procedure, and the update message transmission procedure are described sequentially in FIG. 7A, various embodiments of the disclosure are not limited to the aforementioned order and procedure. That is, in some embodiments, the E2 node and the RIC may independently perform the E2 set-up procedure of the operations 701 to 703. In some embodiments, the E2 node and the RIC may independently perform the subscription procedure of the operations 705 to 707. Meanwhile, according to another embodiment, as described above, the E2 set-up response message may include a subscription request message. In some embodiments, the E2 node and the RIC may independently perform the RIC indication procedure of the operation 709. In addition, in some embodiments, the E2 node and the RIC may independently perform the RIC indication procedure of the operation 709. In addition thereto, the E2 node and the RIC may perform at least some of the aforementioned procedure together or separately.

Figure 7B:
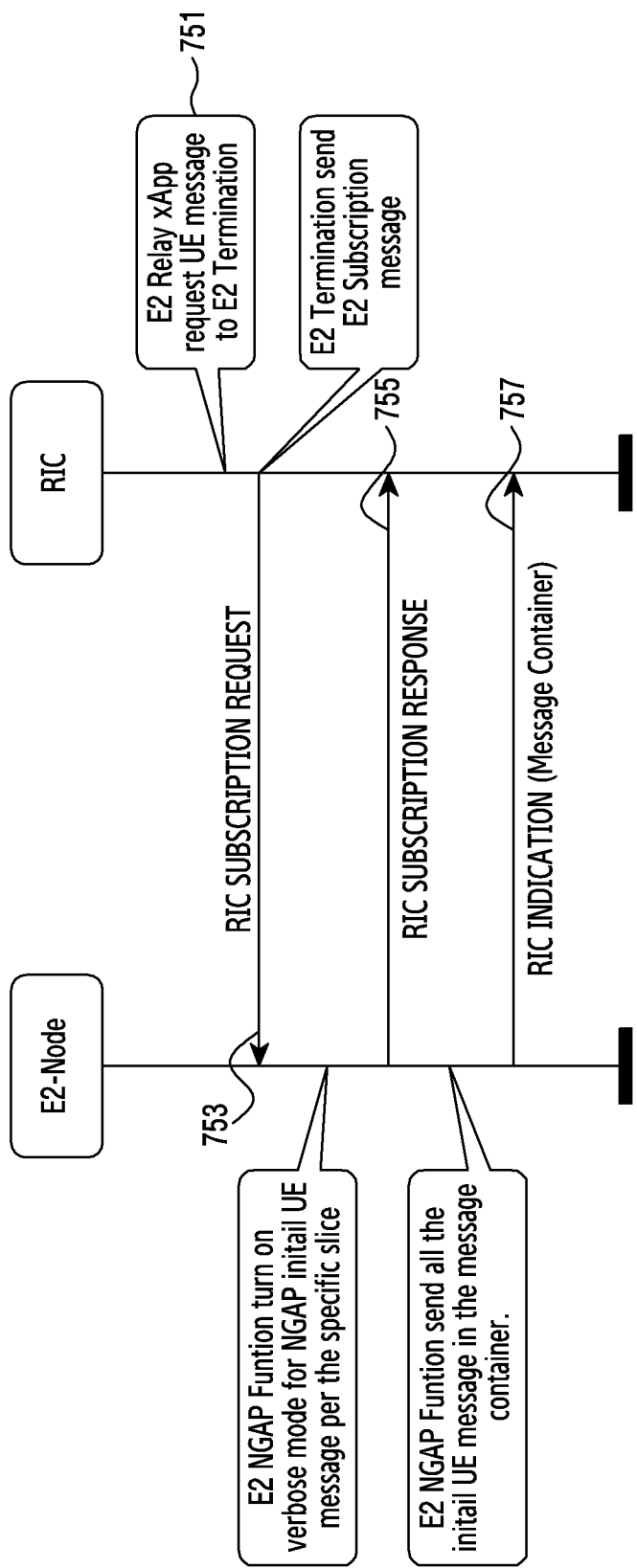
FIG. 7B illustrates an example of a subscription procedure between an E2 node and an RIC according to an embodiment of the disclosure.

FIG. 7B illustrates an example of a subscription procedure between an E2 node and an RIC according to an embodiment of the disclosure. The E2 node 610 is exemplified as the E2 node, and the RIC 640 is exemplified as the RIC.

Referring to FIG. 7B, in operation 751, the RIC may request an E2 termination to subscribe. For example, an E2 relay xApp located in the RIC may request an RIC E2 termination function to subscribe an E2 relay message function and may request an NGAP I/F to subscribe an initial UE message.

In operation 753, the RIC may transmit an RIC subscription request to the E2 node. For example, the RIC E2 termination function generates an initial UE message relay message for the NGAP I/F, requested in operation 751, as an E2 subscription request message and transmits it to the E2 node.

In operation 755, the E2 node may transmit an RIC subscription response to the RIC. Specifically, the E2 node function which has received the E2 subscription request message may decode the message, and if an initial UE message is generated in the NGAP I/F, successfully configure an event condition to be transmitted to the RIC by being carried using a container in an RIC indication message for each UE or each cell or each network slice, and then transfer a subscription response to the RIC to report that the event trigger condition is successfully configured.

In operation 757, the E2 node may transmit an RIC indication to the RIC. When the initial UE message is generated in the NGAP I/F by the UE, the E2 node may transfer the NGAP initial UE message to the RIC by carrying it using a container in the E2 RIC indication message.

Part of the content described in FIG. 7A may also be applied equally or similarly in FIG. 7B.

FIG. 8 illustrates an Information Element (IE) of an E2 subscription request message according to an embodiment of the disclosure. A first IE is a message type, and the message type has a unique value for each E2 message. Details of the message type are illustrated in FIG. 9.

A second IE is an RIC request ID, and specifies a specific xApp. Details of the message are illustrated in FIG. 10.

A third IE is an E2 node function ID. The E2 node function ID may specify a specific E2 node function to a specific E2 node since a range value is divided for each E2 node. Details of the message are illustrated in FIG. 11.

A fourth IE is an RIC subscription type, and may configure an event trigger condition since several types may be added to the E2 node. Details of the event trigger condition type are illustrated in FIG. 12. An E2 message relay defined in the disclosure is one type of event triggering condition types, and details of the message are illustrated in FIG. 13.

FIG. 9 illustrates details of a message type IE according to an embodiment of the disclosure. A first IE is a procedure code value which is an integer value in the range of 0 to 255, and a specific message type (procedure code) is set. For example, a procedure code value of 0 may be set to subscription, a procedure code value of 1 may be set to E2 setup, and a procedure code value of 2 may be set to an indication request message value or the like in the range of 0 to 255, that is, 256 message values. For example, it is defined in the O-RAN as shown in Table 1 below.

TABLE 1

| | |
|---|---|
| id-e2Subscription | ProcedureCode ::= 0 |
| id-e2Setup | ProcedureCode ::= 1 |
| id-e2Indication | ProcedureCode ::= 2 |
| id-e2Control | ProcedureCode ::= 3 |
| id-e2Serviceupdate | ProcedureCode ::= 4 |
| id-e2Servicequery | ProcedureCode ::= 5 |

A type of message which is a second IE in the message type IE indicates a message type, and may define initiating, successful, and unsuccessful messages.

FIG. 10 illustrates an RIC request ID value according to an embodiment of the disclosure. The RIC request ID value is an integer value in the range of 0 to 65535, and may be set to a unique value to a specific xApp.

FIG. 11 illustrates an E2 node function ID value according to an embodiment of the disclosure. The E2 node function ID value is an integer value in the range of 0 to 4095, and may be set by dividing each range value for each E2 node.

TABLE 2

| |
|---|
| O-CU-CP (1~512) |
| O-CU-UP (513~1024) |
| O-DU (1025~1536) |
| O-RAN eNB (1537~2048) |

A value subsequent to 2048 is a reserved value, and may be set when an additional E2 node is added.

FIG. 12 illustrates an RIC subscription type value according to an embodiment of the disclosure. The RIC subscription type value is an integer value in the range of 0 to 255, and may be defined as a trigger value in a specific E2 node function of an E2 node. For example, an I/F-based message relay function may be defined as an RIC subscription type 0.

FIG. 13 illustrates an example of a detailed message for an E2 message relay function proposed according to an embodiment of the disclosure.

A first IE is an interface AP ID which is an integer value in the range of 1 to 32 and specifies a specific I/F. For example, up to 32 I/F definitions are possible in such an order that a set value of LTE RRC of an UU interface between a terminal and an LTE eNB is '0', a set value of NR RRC of a UU interface between a 5G NR O-CU-CP and the terminal is '1', F1 interface is '2', E1 interface is '3', X2 interface is '4', XN interface is '5', NGAP interface is '6', and S1 interface is '7'.

A second IE is a global node ID which is an optional IE, and determines whether a peer base station which has transferred an X2 message is an LTE macro base station or a Home eNB (HeNB) base station, or a 5G-NR base station when an X2 of LTE and an XN I/F message of 5G-NR are relayed and transferred. A detailed IE is illustrated in FIG. 14.

A third IE is a message protocol ID list which may be divided into two types, i.e., an "All Message" IE which specifies a relay for all messages per I/F and a partial message list IE which specifies a relay only for a specific message per I/F. The partial message list may specify up to 256 messages, and each message may be defined by a message ID and optional interface direction defined in subscription message information. The message ID is a unique value defined for an I/F in each of an LTE base station and a 5G NR base station in 3GPP, and a value additionally defined by an O-RAN may be used if a message type (procedure code) value of 3GPP is usable. For example, a value defined in 3GPP is as shown in Table 3 below.

TABLE 3

| | |
|---|---|
| id-handoverPreparation | ProcedureCode ::= 0 |
| id-handoverCancel | ProcedureCode ::= 1 |
| id-loadIndication | ProcedureCode ::= 2 |
| id-errorIndication | ProcedureCode ::= 3 |
| id-snStatusTransfer | ProcedureCode ::= 4 |
| id-uEContextRelease | ProcedureCode ::= 5 |
| id-x2Setup | ProcedureCode ::= 6 |

The interface direction defined as the optional IE may be determined for an I/F message transferrable bidirectionally such as X2/XN, and may determine whether a message of an I/F which requests an RIC to relay is a message incoming from another E2 node (e.g., eNB, O-CU-CP) or an outgoing message.

A fourth IE is a subscription condition. A group unit of message to be relayed to an RIC is defined. TargetUE List is a list of UE identifiers, and details thereof are defined in FIG. 15. TargetSlice list is a list of slices, and details thereof are defined in FIG. 16. TargetCell list is a list of cells, and details thereof are defined in FIG. 17.

FIG. 14 defines a global node IE which is an optional IE limited to an X2/XN message according to an embodiment of the disclosure. Unlike other I/Fs, X2/XN has bi-directivity, and an I/F may be configured between a macro cell LTE base station, a small cell LTE base station, and a 5G NR base station. Therefore, since various combinations of connection are possible, a global ID of an opposite party is important in X2 message transmission. A global node ID IE may be divided into a macro eNB ID, a home eNB ID, a short macro eNB ID, a long macro eNB ID, a 5G-NR gNB ID, or the like.

FIG. 15 illustrates a target UE list IE used when an RIC requests an E2 node to transmit a relay request message on a UE basis according to an embodiment of the disclosure. A target UE list is a list of RAN UE ID defined in 3GPP. It is possible to configure and then transmit up to UEMAX (e.g., 1024) RAN UE IDs.

FIG. 16 illustrates a target slice list IE used when an RIC requests an E2 node to transmit a relay request message on a network slice basis according to an embodiment of the disclosure. A target slice list is a list of single (S)-Network Slice Selection Assistance Information (NSSAI) defined in 3GPP. It is possible to configure and then transmit up to S-NSSAIMAX (e.g., 1024) S-NSSAIs. The NSSAI includes a plurality of parameters required to select a network slice instance belonging to an RAN and CN, and is used to select CCNF and NFI together with UE capability, subscription data, or the like.

FIG. 17 illustrates a target cell list IE used when an RIC requests an E2 node to transmit a relay request message on a cell basis according to an embodiment of the disclosure. A target cell list is a list of EUTRAN cell ID and NR cell ID defined in 3GPP. It is possible to configure and then transmit up to 1024 cell IDs.

FIG. 18 illustrates a target group ID list IE used when an RIC requests an E2 node to transmit a relay request message on a group basis according to an embodiment of the disclosure. A target group ID list is a list of Subscriber Profile ID (SPID) or Additional RRM Policy ID (ARPI) defined in 3GPP. It is possible to configure and then transmit up to 256 groups IDs.

FIG. 19 is an example of a detailed message for an E2 relay subscription response function proposed according to an embodiment of the disclosure.

A first IE is a message type, and has a unique value for each E2 message. Details of the message type are illustrated in FIG. 9.

A second IE is an RIC request ID, and specifies a specific xApp. Details of the message are illustrated in FIG. 10.

A third IE is an E2 node function ID. The E2 node function ID may specify a specific E2 node function to a specific E2 node since a range value is divided for each E2 node. Details of the message are illustrated in FIG. 11.

A fourth IE is a subscription result. A group unit of message to be relayed to an RIC is defined. TargetUE List is a list of UE identifiers, and details thereof are defined in FIG. 15. TargetGroup list is a list of cells, and details thereof are defined in FIG. 18. TargetCell list is list of cells, and details thereof are defined in FIG. 17. TargetSlice list is a list of slices, and details thereof are defined in FIG. 16.

A fifth IE is a subscription message condition, and is IE(s) which sets a failed message ID when a subscription procedure fails. When it is set to all messages, it means a case where subscription is impossible in an I/F which is configured in an E2 subscription request message interface AP ID. When it is set to a partial message list, it means that subscription is impossible limitedly for specific application protocol messages configured in a list of message IDs.

According to various embodiments of the disclosure, an E2 subscription message is used to configure an event condition (for each I/F, for each call processing function) in a call processing function of an O-RU, O-DU, O-CU-CP, or O-CU-UP, and a 3GPP message is transferrable to the RIC by packaging in a specific call processing function or all call processing functions generated for each I/F. Therefore, it is possible to effectively provide a call processing request service of the RIC.

Methods based on the embodiments disclosed in the claims and/or specification of the disclosure may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may have an access to a device for performing an embodiment of the disclosure via an external port. In addition, an additional storage device on a communication network may have an access to the device for performing the embodiment of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an E2 node, the method comprising:
   receiving, from a Radio Access Network (RAN) Intelligent Controller (RIC), via an E2 interface, an RIC subscription request message for a RAN function supported by the E2 node; and
   transmitting, to the RIC via the E2 interface, a RIC subscription response message to accept the RIC subscription request message,
   wherein the RIC subscription request message comprising information indicating a network interface type and information indicating a group identifier (ID) list for the RAN function supported by the E2 node, and
   wherein a maximum number of at least one group ID included in the group ID list is 256.

2. The method of claim 1, wherein the network interface type comprises at least one of an F1 interface, an E1 interface, an X2 interface, an XN interface, a next generation (NG) interface, or an S1 interface.

3. The method of claim 1,
   wherein the RIC subscription request message comprises an RAN function identifier (ID), and
   wherein the RIC subscription request message is a message for subscribing a function corresponding to the RAN function ID.

4. The method of claim 1,
   wherein the RIC subscription request message comprises a node identifier (ID), and
   wherein the node identifier indicates at least one of an evolved NodeB (eNB) ID or a next generation NodeB (gNB) ID.

5. The method of claim 1,
   wherein the RIC subscription request message further comprises an interface direction Information Element (IE), and
   wherein the interface direction IE indicates at least one of incoming or outgoing.

6. The method of claim 1, further comprising:
   transmitting, to the RIC via the E2 interface, a service update message associated with a modified E2 node function.

7. The method of claim 1,
   wherein the RIC is a near Real Time (RT) RIC, and
   wherein the E2 node comprises an open RAN (O-RAN) Distributed Unit (O-DU), an O-RAN Central Unit-Control Plane (O-CU-CP), an O-RAN Central Unit-User Plane (O-CU-UP), or an O-RAN evolved NodeB (O-eNB).

8. A method performed by a radio access network (RAN) intelligent controller (RIC), the method comprising:
   transmitting, to an E2 node via an E2 interface, an RIC subscription request message for a RAN function supported by the E2 node; and
   receiving, from the E2 node via the E2 interface, a RIC subscription response message for accepting the RIC subscription request message,
   wherein the RIC subscription request message comprising information indicating a network interface type and information indicating a group identifier (ID) list for the RAN function supported by the E2 node, and
   wherein a maximum number of at least one group ID included in the group ID list is 256.

9. The method of claim 8, wherein the network interface type comprises at least one of an F1 interface, an E1 interface, an X2 interface, an XN interface, an NG interface, or an S1 interface.

10. The method of claim 8,
    wherein the RIC subscription request message comprises an RAN function identifier (ID), and wherein the RIC subscription request message is a message for subscribing to a function corresponding to the RAN function ID of the E2 node.

11. The method of claim 8,
wherein the RIC subscription request message comprises a node identifier (ID), and
wherein the node identifier indicates at least one of an evolved NodeB (eNB) ID or a next generation NodeB (gNB) ID.

12. The method of claim 8,
wherein the RIC subscription request message further comprises an interface direction information element (IE), and
wherein the interface direction IE indicates at least one of incoming or outgoing.

13. The method of claim 8, further comprising:
transmitting, to the RIC via the E2 interface, a service update message associated with a modified E2 node function.

14. The method of claim 8,
wherein the RIC is a near real time (RT) RIC, and
wherein the E2 node comprises an O-RAN distributed unit (O-DU), an O-RAN central unit-control plane (O-CU-CP), an O-RAN central unit-user plane (O-CU-UP), or an O-RAN evolved NodeB (O-eNB).

15. The method of claim 8, further comprising:
requesting, by an E2 Relay xApp positioned in the RIC, a subscription for an initial user equipment (UE) message in a next generation application protocol (NGAP) interface for an E2 Relay message function from an RIC E2 termination function;
transmitting an RIC subscription request to the E2 node; and
receiving, from the E2 node, an RIC subscription response, the RIC subscription response including an RIC indication message per UE, per cell, or per network slice in response to the initial UE message occurring in the NGAP interface, based on a trigger condition being successfully set.

16. An apparatus functioning as an E2 node, the apparatus comprising:
at least one transceiver; and
at least one processor coupled with the at least one transceiver, and configured to:
receive, from a Radio Access Network (RAN) Intelligent Controller (RIC), via an E2 interface, an RIC subscription request message for a RAN function supported by the E2 node, and
transmit, to the RIC via the E2 interface, a RIC subscription response message to accept the RIC subscription request message,
wherein the RIC subscription request message comprising information indicating a network interface type and information indicating a group identifier (ID) list for the RAN function supported by the E2 node, and
wherein a maximum number of at least one group ID included in the group ID list is 256.

17. An apparatus functioning as a radio access network (RAN) intelligent controller (RIC), the apparatus comprising:
at least one transceiver; and
at least one processor coupled with the at least one transceiver, and configured to:
transmit, to an E2 node via an E2 interface, an RIC subscription request message for a RAN function supported by the E2 node, and
receive, from the E2 node via the E2 interface, a RIC subscription response message for accepting the RIC subscription request message,
wherein the RIC subscription request message comprising information indicating a network interface type and information indicating a group identifier (ID) list for the RAN function supported by the E2 node, and
wherein a maximum number of at least one group ID included in the group ID list is 256.

* * * * *